Figure 1:

United States Patent [19]

Conrard et al.

[11] Patent Number: 5,043,496

[45] Date of Patent: Aug. 27, 1991

[54] PROCESS FOR THE TREATMENT OF HEAVY CHLORINATION RESIDUES

[75] Inventors: Claude Conrard, Tavaux; Lucien Menetrier, Dole, both of France

[73] Assignee: Solvay & Cie (Société Anonyme), Brussels, Belgium

[21] Appl. No.: 504,172

[22] Filed: Apr. 4, 1990

[30] Foreign Application Priority Data

Apr. 14, 1989 [FR] France .................. 89 05094

[51] Int. Cl.$^5$ .............................. C07C 17/38
[52] U.S. Cl. ...................... 570/211; 570/238; 570/262; 570/264
[58] Field of Search .............. 570/211, 238, 264, 262

[56] References Cited

U.S. PATENT DOCUMENTS 4,387,018 6/1983 Cooke et al. ............ 570/211
4,540,837 9/1985 Schmidhamer et al. ........ 570/211

FOREIGN PATENT DOCUMENTS 16850 4/1974 Japan .................. 570/211
0038342 3/1980 Japan .................. 570/264

OTHER PUBLICATIONS

Chemical Patents Index, Basic Abstracts Journal, semaine 8748, 3 fevrier 1988, section C, resume No. 87-337210/48.

Primary Examiner—Werren B. Lone
Attorney, Agent, or Firm—Spencer & Frank

[57] ABSTRACT

The present invention relates to a process for the treatment of heavy residues produced in the manufacture of chlorinated products, in which process a chemical compound chosen from certain fatty compounds is added to the heavy residues in order to form fluid and stable liquid suspensions.

8 Claims, 2 Drawing Sheets

PROCESS FOR THE TREATMENT OF HEAVY CHLORINATION RESIDUES

The present invention relates to a process for the treatment of heavy residues produced in the manufacture of chlorinated products, in which process a chemical compound chosen from certain fatty compounds is added to the heavy residues in order to form fluid and stable liquid suspensions.

The chlorination processes, and more particularly the processes for chlorination of $C_1$ to $C_4$ hydrocarbons, which are frequently carried out at high temperature, generate the formation of heavy residual by-products containing chlorinated hydrocarbons such as hexachloroethane, hexachlorobutadiene and hexachlorobenzene.

Heavy residues of this type present various problems in respect of technology and in respect of ecology, such as:

the need to recover and to separate the organic products which can be utilized and are still buried in the residues, and the disposal, in an ecologically acceptable manner, of the products which cannot be utilized industrially.

These various problems, which have been resolved in a more or less fragmentary fashion in the existing industrial installations, necessitate a continuous monitoring from an industrial standpoint in order to improve the yields from the recovery of the utilizable products on the one hand, and on the other hand, from an ecological standpoint, in order to render the waste material unobjectionable to the environment and to make it meet more and more stringent ecological demands.

One solution, recently proposed in U.S. Pat. No. 4,540,837, consists in dissolving the heavy residues from the chlorination at temperatures of between 100° and 180° C. in tarry hydrocarbons obtained as byproducts from the pyrolysis of 1,2-dichloroethane and/or in hydrocarbons having a low content of aromatic products having a boiling point of between 160° and 300° C. and finally in incinerating the solutions thus obtained.

This process, which, by the incineration step, allows the current need for subterranean storage of products such as a hexachlorobenzene to be abolished, nevertheless still has a certain number of drawbacks. Thus, in order to function well, it requires very high dilutions; otherwise it does not prevent the settling of certain products, such as hexachlorobenzene, described previously as non-utilizable. Moreover, when it is carried out under ideal conditions, i.e. with perfect solutions, it requires amounts of diluent such that it finally becomes necessary to burn up to ten times the quantity of the residues used. Now it is evident that an operation of this type causes the loss of products which may still be utilizable and, although it is coupled with a recovery of hydrochloric acid, causes the emission into the atmosphere of an excess of other undesirable gases in a direct ratio with the amounts of materials incinerated.

A process for the treatment of chlorination residues has now been found which no longer possesses the drawbacks of the abovementioned process in which the residues are dissolved in an excess of diluent and which renders the disposal of the residues by incineration utilizable in practice. This process enables the chlorination residues to be incinerated without it being necessary to resort to intolerable excesses of materials to be incinerated and without needless loss of raw materials.

To this end, the present invention relates to a process for the treatment of heavy residues resulting from the manufacture of chlorinated hydrocarbons, according to which process one or more chemical compounds chosen from fatty acids, fatty alcohols or fatty esters are added to the heavy residues.

Heavy residues resulting from the production of chlorinated hydrocarbons are understood to be any chlorinated hydrocarbon residue containing heavy impurities such as hexachlorobenzene, displaying a settling phenomenon, due to the formation of crystals of these heavy impurities, at below 100° to 120° C.

Usually the process of the invention is carried out with heavy chlorinated hydrocarbon residues in which at least 5% by weight of the total composition consists of hexachlorobenzene. Generally the process is carried out on residues in which at least 10% by weight of the total composition consists of hexachlorobenzene.

Preferably, the heavy residues treated contain other residual products, such as hexachlorobutadiene and/or hexachloroethane; in this case the process is usually carried out with heavy chlorinated hydrocarbon residues in which at least 20%, and preferably 30%, by weight of the total composition consists of hexachlorobenzene and hexachlorobutadiene. The good results observed with the process of the invention are illustrated in Example 1 with a composition of heavy chlorinated hydrocarbon residues containing 50% by weight of perchloroethylene, 25% by weight of hexachlorobutadiene and 25% by weight of hexachlorobenzene.

Finally, the process of the invention proves particularly valuable when it is carried out on compositions containing at least 50%, and preferably at least 90 to 95% or even 100%, by weight of perchlorinated compounds such as hexachloroethane, hexachlorobutadiene and hexachlorobenzene. Good results observed with such compositions are illustrated in Example 3 with a composition of heavy chlorinated hydrocarbon residues containing 50% by weight of hexachlorobutadiene and 50% by weight of hexachlorobenzene.

The heavy chlorinated hydrocarbon residues used in the process of the invention are usually produced in the chlorination of hydrocarbons containing from 1 to 4 carbon atoms and preferably containing from 1 to 3 carbon atoms; the starting hydrocarbons can be of aliphatic or olefinic character and can optionally already be substituted by halogen atoms, such as chlorine. Preferably, heavy residues are used which are produced from the manufacture of tetrachloromethane, perchloroethylene or trichloroethylene or from the pyrolysis of compounds, which may or may not be chlorinated, containing up to 3 carbon atoms.

The chemical compounds chosen from the fatty acids, fatty alcohols and fatty esters generally used according to the process of the invention are usually chosen from the chemical compounds of these families containing at least 12 to 25 carbon atoms. Preferably, the process is carried out with fatty acids, such as hydroxy acids which may or may not contain hydrocarbon side chains, fatty alcohols and fatty esters, termed saturated or unsaturated, containing 16 to 25 carbon atoms or a mixture of these, and technical grade stearic acid, hydroxy acids and esters of lanolin are very particularly preferred; the best results have been obtained with technical grade stearic acid.

Apart from pure chemical compounds, it is possible to use mixtures of fatty compounds such as those defined above. An advantageous form which can be used within the context of the present invention of course consists in using the fatty compounds in the form of the grade termed "technical".

The chemical compounds chosen from the fatty acids, alcohols and esters are generally used in the present invention in a proportion of 2 to 60% by weight of the total composition used. Customarily, from 5 to 50% by weight of these chemical compounds, relative to the total composition, are used. Good results have been observed with 10% to 50% by weight of stearic acid in compositions consisting of a 50/50 mixture of hexachlorobutadiene and hexachlorobenzene.

Apart from the chemical compounds chosen from the fatty acids, alcohols and esters, products such as heavy hydrocarbons having a boiling point greater than 150° C. measured under a pressure of one atmosphere can advantageously be used in the compositions. Examples which may be mentioned of such products are kerosene and other light or heavy fuels; preferably, however, for obvious ecological reasons, heavy fuel, preferably free from $SO_2$, is used at this level.

The process according to the present invention enables heavy impurities, such as hexachlorobenzene, present in the heavy residues produced in the manufacture of chlorinated hydrocarbons to be suspended and, thus, a fluidization of the heavy residues to be effected. This fluidization in the form of a suspension enables easy cycling of a homogeneous suspension at a relatively low temperature and easy pumping of the suspension with a view to feeding it to the incinerator at the desired time.

The suspension of the heavy residues to which chemical compounds have been added in accordance with the process of the invention can be effected by any known means and customarily takes place with the aid of mechanical means, such as agitation. Depending on the particular composition of heavy residues to be treated, the agitation can be more or less vigorous.

When the composition of heavy chlorinated hydrocarbon residues consists virtually solely of non-utilizable heavy products such as hexachloroethane, hexachlorobutadiene and hexachlorobenzene, it is necessary to resort to mechanical means enabling vigorous agitation, such as obtained by violent crushing in equipment of the agitator/grinder type, to effect the suspension. Thus, in the case of a heavy residue containing 50% by weight of hexachlorobutadiene and 50% of hexachlorobenzene, it is necessary to resort to malaxating for 3 minutes in an agitator/grinder in which the screw turns at at least 10,000 and preferably at 15,000 revolutions/minute in order to effect the suspension. In this specific case, crushing proves to be a significant operation for obtaining stable suspensions at low temperature.

The temperature at which the chemical compound chosen from the fatty acids, alcohols and esters is added to the heavy residues consisting solely of non-utilizable products, such as hexachlorobutadiene and hexachlorobenzene, also proves to be a significant parameter for obtaining good fluid, stable suspensions. In general, 200° C. The preferred temperatures for this addition are between 65° and 150° C. Finally, good results are generally obtained when the addition is made at around 80° C.

The pressure at which the process is carried out is generally between 1 and 50 bars. Good results have been obtained at atmospheric pressure.

The addition of chemical compounds in the process according to the invention can be made at any time before, during or after mechanical crushing of the heavy residues but, for practical reasons, is generally made just before the mechanical suspending operation.

Although the Applicant Company does not consider itself to be bound or restricted in these claims by any theoretical explanation of the phenomenon of suspending heavy residues and keeping these in stable suspensions by the process of the invention, it nevertheless appears to the Applicant Company to be useful to provide the following explanations relating to residues consisting solely of non-utilizable heavy residues as previously defined.

Figure 2:
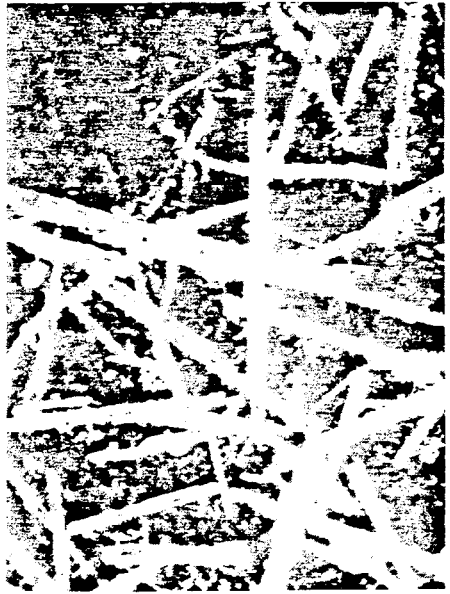
Figure 3:
Figure 4:

In fact, for a heavy residue consisting of hexachlorobutadiene and hexachlorobenzene in a ratio of 50/50, microscope measurements enable it to be differentiated that:

on the one hand the dimensions of the crystals present in the medium are virtually identical for a residue:

after crushing in an agitator/grinder for 3 minutes at 80° C. and after subsequent heating to 150° C., followed by cooling to 80° C. when 20% of stearic acid is added to the starting heavy residue after crushing FIGS. 1 and 2), and on the other hand, the dimensions of the crystals present in the medium are highly different for the residue:

after crushing in an agitator/grinder for 3 minutes at 80° C. and after subsequent heating to 150° C. followed by cooling to 80° C. when a chemical compound is not added to the starting heavy residue (FIGS. 3 and 4). Consequently, the effect of the chemical compounds added would seem to be a stabilizing effect on the crystal size, that is to say an effect inhibiting the growth and the agglomeration of the crystals and consequently a stabilizing effect on the suspensions, which therefore remain fluid when they are kept at above 50° C., this effect probably being due to a coating of the small crystals present in the heavy residues by the particular chemical compounds added.

The suspensions obtained according to the process of the invention remain stable and fluid down to temperatures as low as 50° C. Moreover, after solidification they can be suspended again by simple reheating without their stability and fluidity being affected Moreover, the suspensions also retain their properties after having been subjected to elevated temperatures of the order of 250° to 300° C. (as, for example, in a preheater of an incinerator). It follows from the above that the suspensions obtained by the process of the invention are in an ideal form for incineration with intermediate storage of the products to be incinerated. In fact, storage and cycling of these products can be effected at relatively low temperatures without risk of settling and congealing in a mass in the equipment under normal operation. Furthermore, if for any reason the heating of the installation cannot be ensured in a continuous manner, resuspending can be ensured by simple reheating of the installation without any other operation of purging or the like.

Figure 5:
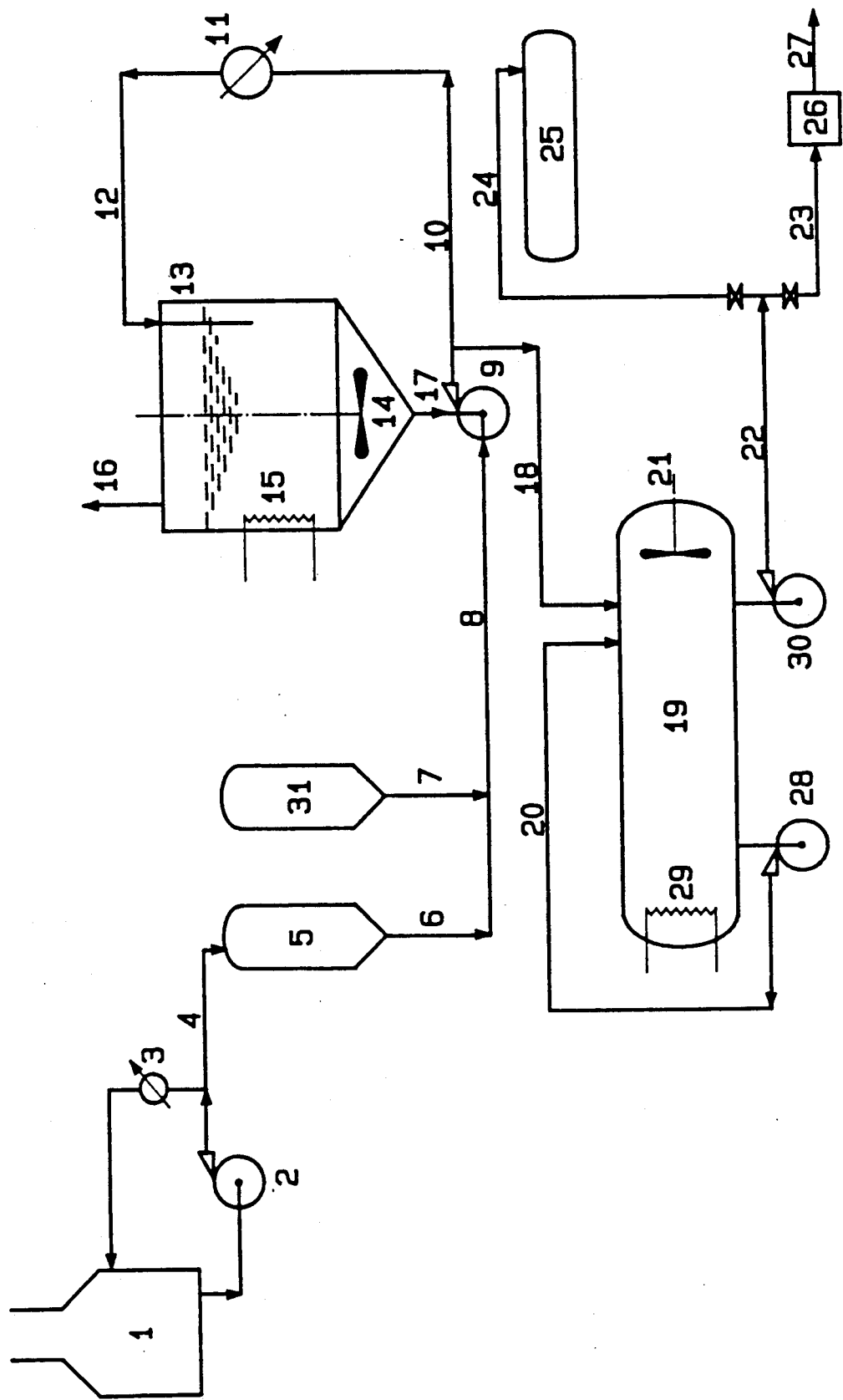

The process according to the invention can be carried out in any installation enabling, the operating conditions described above to be combined. A general diagram of an installation is shown in FIG. 5. This installation comprises a column for separation or distillation of light products and heavy products 1, a pump 2 and a heat exchanger 3 enabling the starting material to be heated. The hot heavy product issuing from column 1 is fed via a pipe 4 to a buffer reservoir 5. The heavy product is withdrawn from this buffer reservoir 5 via a pipe 6, into which the chemical compound or compounds according to the invention, which are stored in the tank 31, are fed via the pipe 7. From there a pipe 8 transfers the heavy product towards a grinding pump 9 and, via the pipe 10, into a heat exchanger 11. The product is then fed via the pipe 12 into a tank 13 fitted with a stirrer 14 and a heating system 15. From this tank 13, which is fitted with a degassing pipe 16, the heavy product is either recycled via the pipe 17 towards the grinding pump 9 or is transferred to a buffer reservoir 19 via the pipe 18. The buffer reservoir 19 is fitted with a stirrer 21 and a heating system 29. The heavy product is then either recycled, via the pump 28, via the pipe 20 into the tank 19 or transferred, via the pump 30, via the pipe 22. The product is transferred via the pipe 22 either via the pipe 24 towards a cistern 25 for storage or via the pipe 23 towards an incinerator 26; the burned products are transferred via the pipe 27.

The invention is illustrated by the examples which follow.

EXAMPLE 1R 1 kg of a mixture originating from the manufacture of trichloroethylene and containing 250 g of hexachlorobenzene, 250 g of hexachlorobutadiene and 500 g of perchloroethylene at 200° C. at atmospheric pressure is used.

This mixture is cooled to 80° C. and grinding is carried out for 3 minutes in a mixer having a 3-vane screw 50 mm in diameter which rotates at 15,000 revolutions/minute.

A highly fluid solution is obtained containing fine crystals which settle.

EXAMPLE 2

1 kg of a mixture identical to that of Example 1R is brought to ambient temperature at atmospheric pressure.

200 g of technical grade stearic acid are added to this mixture.

The mixture is brought to the boil at 200° C.; a solution is obtained.

The solution is cooled to 80° C. and grinding is carried out for 3 minutes in a mixer having a 3-vane screw 50 mm in diameter which rotates at 15,000 revolutions/min.

A suspension is obtained which no longer settles and has a kinematic viscosity of 1.6 degrees Engler measured at 80° C. (approximately 6 centistokes, reference standard Afnor NFT 60100).

EXAMPLE 3, 4 and 5

1 kg of a composition of heavy chlorinated hydrocarbon residues containing 50% by weight of hexachlorobutadiene and 50% by weight of hexachlorobenzene is used.

200 g of stearic acid are added to this composition, at 80° C. for Example 3, at 150° C. for Example 4 and at 220° C. for Example 5.

The mixture is cooled to 80° C. with slow stirring and grinding is carried out for 3 minutes in a mixer similar to that described in Example 2.

Pumpable suspensions are obtained which do not settle. The kinematic viscosities obtained, measured at 80° C., are collated in Table 1.

TABLE 1

| EXAMPLES | KINEMATIC VISCOSITY | |
|---|---|---|
| | DEGREES ENGLER | CENTISTOKES |
| 3 | 1.6 | 6 |
| 4 | 1.6 | 6 |
| 5 | 1.9 | 9.5 |

EXAMPLES 6 and 7

1 kg of a composition of heavy chlorinated hydrocarbon residues containing 50% by weight of hexachlorobutadiene and 50% by weight of hexachlorobenzene is used.

For Example 6, 1 kg of heavy fuel No. 2 are added at 220° C. at atmospheric pressure. The mixture is then cooled to 80° C. and 100 g of stearic acid are added at this temperature.

Grinding is then carried out for 3 minutes in a mixer having a 3-vane screw 50 mm in diameter which rotates at 15,000 revolutions/min.

For Example 7, stearic acid is added at 220° C. and the heavy fuel No. 2 at 80° C., in reverse order.

Suspensions are obtained which do not settle. The kinematic viscosities obtained (measured at 80° C.) are collated in Table 2.

TABLE 2

| EXAMPLES | KINEMATIC VISCOSITY | |
|---|---|---|
| | DEGREES ENGLER | CENTISTOKES |
| 6 | 4.8 | 35 |
| 7 | 1.8 | 8.5 |

EXAMPLES 8, 9 and 10

1 kg of a composition of heavy chlorinated hydrocarbon residues containing 50% by weight of hexachlorobutadiene and 50% by weight of hexachlorobenzene is used.

200 g of heavy fuel No. 2 are added to this composition, at 80° C. for Example 8, at 150° C. for Example 9 and at 220° C. for Example 10 at atmospheric pressure.

The mixture is cooled to 80° C. with slow stirring and grinding is carried out for 3 minutes in a mixer similar to that described in Example 2.

Pumpable suspensions are obtained which do not settle.

The kinematic viscosities obtained, measured at 80° C., are collated in Table 3.

TABLE 3

| EXAMPLES | KINEMATIC VISCOSITY | |
|---|---|---|
| | DEGREES ENGLER | CENTISTOKES |
| 8 | 2.9 | 19 |
| 9 | 3.6 | 25 |
| 10 | 4.5 | 32 |

We claim:

1. A process for the fluidization of heavy residues, comprising:
   a step for mixing at least one fatty acid, fatty alcohol or fatty ester with a heavy residue resulting from the manufacture of chlorinated hydrocarbons to form a mixture, and
   a step for treating said mixture to form a suspension.

2. The process according to claim 1, wherein characterized in that the process is carried out with heavy residues containing hexachlorobenzene.

3. The process according to claim 2, wherein the hexachlorobenzene content in the heavy residues is at least 5% by weight.

4. The process according to claim 1, wherein the heavy residues also contain hexachlorobutadiene.

5. The process according to claim 4, wherein the process is carried out with heavy residues in which at least 20% of the total composition consists of hexachlorobenzene and hexachlorobutadiene.

6. The process according to claim 1 wherein the compounds chosen from the fatty acids, fatty alcohols and fatty esters contain at least 12 carbon atoms.

7. The process according to claim 6, wherein the chemical compound is used in the form of the grade termed "technical".

8. The process according to claim 6, wherein the chemical compounds are used in a proportion of 2 to 60% by weight of the total composition.

* * * * *